R. P. JACKSON.
SYSTEM OF ELECTRICAL DISTRIBUTION.
APPLICATION FILED DEC. 6, 1907.

1,116,430.

Patented Nov. 10, 1914.
2 SHEETS—SHEET 1.

WITNESSES:
C. L. Belcher
Otto S. Schairer

INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

SYSTEM OF ELECTRICAL DISTRIBUTION.

1,116,430.  Specification of Letters Patent. Patented Nov. 10, 1914.

Application filed December 6, 1907. Serial No. 405,379.

*To all whom it may concern:*

Be it known that I, RAY P. JACKSON, a citizen of the United States, and a resident of Wilkinsburg, in the county of Allegheny and State of Pennsylvania, have invented a new and useful Improvement in Systems of Electrical Distribution, of which the following is a specification.

My invention relates to systems of electrical distribution, and particularly to systems in which generators are connected to the distributing circuits by means of circuit-breakers that are opened automatically upon the occurrence of predetermined abnormal circuit conditions.

The object of my invention is to provide means for so limiting the conditions of a circuit that the circuit-breakers therein may not be caused to open under unduly abnormal circuit conditions for which they are not adapted.

Upon the occurrence of a ground or short-circuit in a distributing system, it has frequently been found that the amount of current which traverses the circuit rapidly becomes more and more abnormal. For example, upon the occurrence of a ground or short-circuit upon one of a plurality of feeder circuits supplied from the same generator, substantially all of the current which the generator is capable of supplying may, within a very short period of time, be caused to traverse the injured circuit. Also, when the voltage of a circuit is governed by adjusting the field strength of the generator by means of a regulator, such, for example, as that which constitutes the subject-matter of Patent No. 725,800, the field strength of the generator will be caused to increase very quickly by the regulator, and the amount of current traversing the circuit is, in turn, quickly increased. If the circuit-breakers are provided with means for automatically delaying their operation a predetermined period of time, or are inherently slow in operation, they may not open until the circuit conditions have become unduly abnormal and much more severe than those under which the circuit-breakers are adapted to open. Serious injury has, therefore, sometimes resulted to the circuit-breakers, and it is accordingly the object of the present invention to prevent injuries thereto that have heretofore resulted from this cause.

Figure 1:
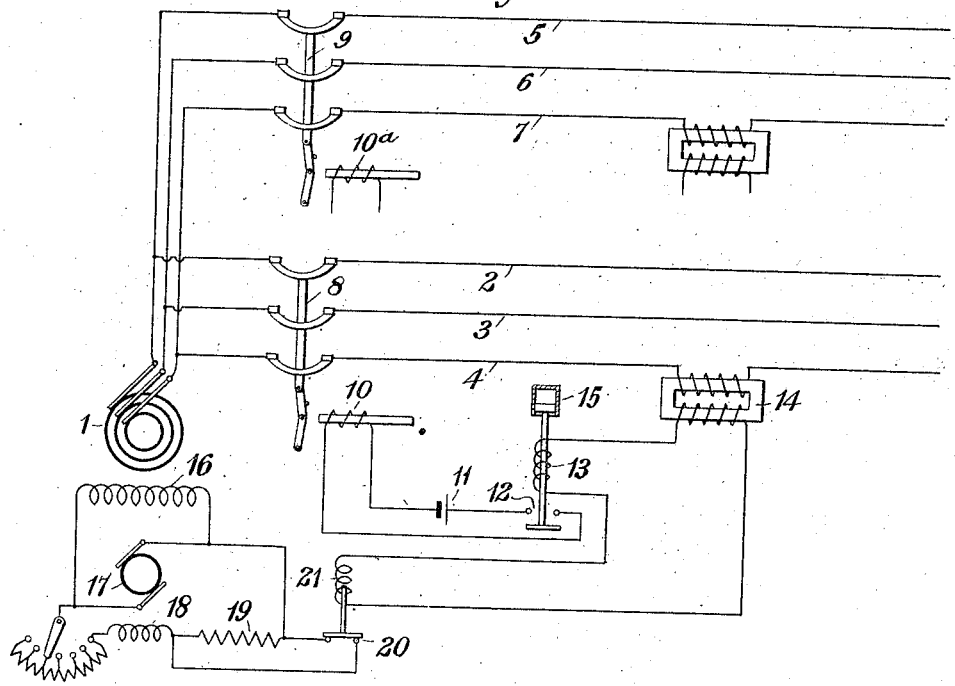
Figure 2:
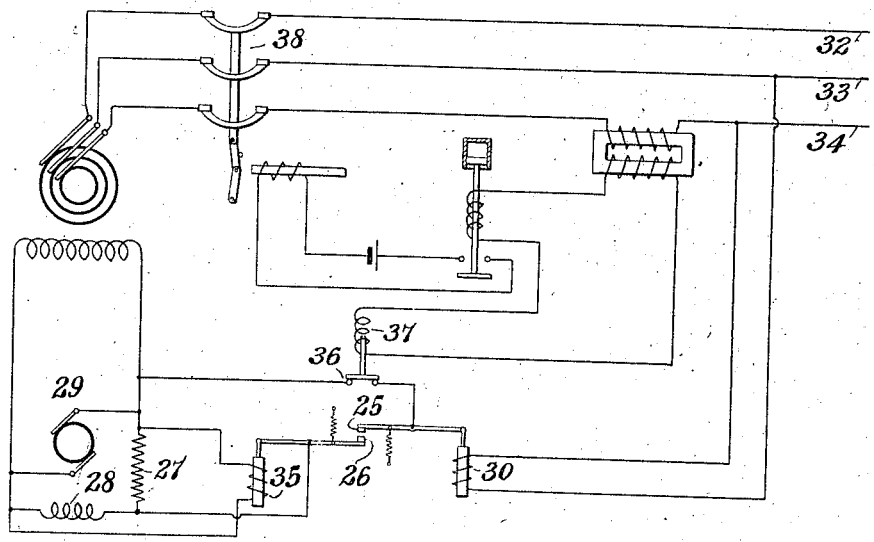
Figure 3:
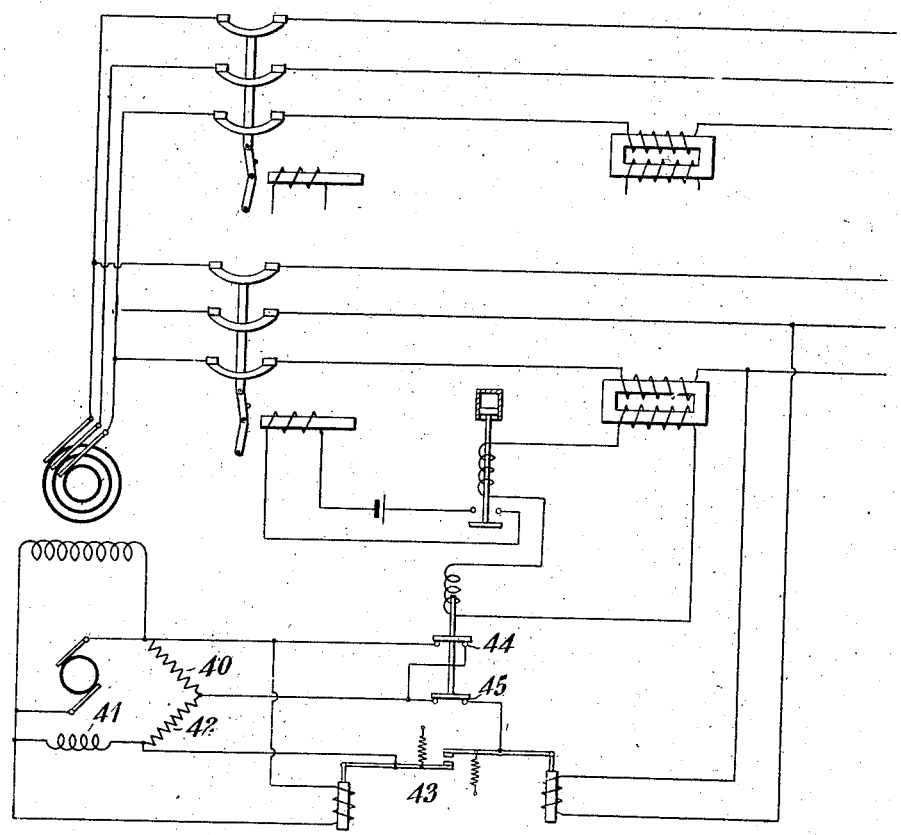

Figure 1 of the accompanying drawings is a diagrammatic view of a system of distribution that embodies my invention, and Figs. 2 and 3 are similar views of modifications of the system of Fig. 1.

A generator 1 is connected to two feeder or distributing circuits 2—3—4 and 5—6—7 by means of circuit-breakers 8 and 9 having tripping mechanisms comprising magnet windings 10 and 10ª the circuits of which are similarly controlled, and it will, therefore, be necessary to describe the remainder of the system with reference to but one of the distributing circuits.

The circuit of magnet winding 10 is supplied from a battery 11, or it may be supplied from any other suitable source, and it is governed by means of a relay switch 12 having an operating magnet winding 13 the energizing current for which is supplied by a series transformer 14 and is proportional in amount to that which traverses circuit conductor 7. The relay switch 12 is provided with a dash-pot 15, or other suitable means for delaying its closure until the abnormal amount of current at which the switch is adapted to operate has persisted in the circuit a predetermined period of time.

Field magnet winding 16 of the generator 1 is supplied from a suitable exciter 17 having a field magnet winding 18 in the circuit of which is a resistance 19 that is normally shunted by means of a quick-acting relay switch 20. The relay switch 20 is provided with an operating magnet winding 21 the energizing current for which is supplied by the series transformer 14 and is proportional in amount to that traversing circuit conductor 4. The field strength of the exciter may be adjusted manually in the usual manner by means of a rheostat 21.

Upon the occurrence of a ground or short-circuit on either of the lines 2—3—4 or 5—6—7, practically all of the current supplied by the generator may soon traverse the the injured line, and it has, therefore, sometimes been necessary to provide circuit-breakers in each line which were capable of breaking the circuit when traversed by the total generator current. In the present instance, however, if one of the lines is traversed by a predetermined amount of current the relay switch 20 is immediately opened to include the resistance 19 in series with field magnet winding 18 of the exciter 17, whereby the field strength and the voltage of the exciter are reduced. It follows that the generator 1 cannot supply more than a predetermined amount of current to the injured circuit because of the limited excitation of its field magnet. The switch 20 is arranged to operate very quickly in order that the resistance 19 may be inserted in the field magnet circuit of the exciter before the switch 12 can be closed to enable the battery to energize the tripping coil of the circuit-breakers. Thus, the current supplied to the injured line by the generator 1 will be promptly so limited that the circuit may subsequently be interrupted by the circuit-breakers without injury thereto, and the circuit-breakers may, therefore, be adapted for less current capacity than the total amount of current which may be supplied by the generator.

As indicated in Fig. 1, the field strength of the exciter is manually adjustable, but, as indicated in Fig. 2, the adjustment is effected automatically by means of a regulator of the type set forth in Patent No. 725,800. The regulator comprises two switch members 25 and 26 for governing a circuit in shunt to a resistance 27 in the circuit of field magnet winding 28 of an exciter 29, switch member 25 being operated by means of a magnet winding 30 in response to variations in the voltage of the distributing circuit 32—33—34, and switch member 26 being operated by means of a magnet winding 35 in response to variations of the exciter voltage. The circuit in shunt to the resistance 27 is also governed by means of a quick-acting relay switch 36 that is operated by means of a magnet winding 37 when the circuit conductor 34 is traversed by more than a predetermined amount of current. The remainder of the system is substantially like that shown in Fig. 1. If the relay switch 36 were not provided, the voltage of the circuit 32—33—34 would decrease very materially upon the occurrence of a ground or short-circuit therein, and the regulator switch members 25 and 26 would, consequently, be maintained in engagement, with the result that the field strengths of the exciter and the generator would be very materially increased, so that, by the time the circuit-breakers 38 could be caused to open, the current traversing the circuit might greatly exceed that which the circuit-breakers are adapted to interrupt. The relay switch 36, however, prevents the sudden increase in the amount of current traversing the circuit, by opening the circuit in shunt to the resistance 27 upon the occurrence of the predetermined abnormal circuit conditions and by thereby causing the field strengths of the exciter and of the generator to be reduced. The switch 36 operates very quickly in order that the generator field strength may be reduced before sufficient time has elapsed for opening the circuit-breakers 38.

When two or more distributing lines are supplied from the same generator, the resistance employed in connection with the voltage regulating device in the field circuit of the exciter may not be sufficient to cause the desired reduction in the field strength of the generator upon the occurrence of a ground or short-circuit. In Fig. 3, therefore, an additional resistance 40 is included in circuit with field magnet winding 41 of the exciter in addition to a resistance 42 that is employed in connection with a voltage regulator 43, the resistance 40 being normally shunted by relay switch 44 that is operated promptly when the circuit is traversed by more than a predetermined amount of current, together with a switch 45, similar to the switch 36 of Fig. 2, which opens the shunt circuit to the resistance 42. In this manner, sufficient resistance is introduced into the field magnet circuit of the exciter to cause such a reduction of the field strength of the generator that the current traversing an injured line supplied from a generator, to which one or more other lines are connected, may not exceed the maximum current value at which the circuit-breakers are intended to operate.

Other variations, as regards devices and circuit connections, may be made within the scope of my invention, if desired.

I claim as my invention:

1. The combination with an electric circuit, a generator, and circuit-breakers connecting the generator to the circuit, of means for causing the circuit-breakers to open upon the persistence of abnormal circuit conditions for a predetermined period of time, and means for promptly reducing the field strength of the generator upon the occurrence of the said abnormal circuit conditions.

2. The combination with an electric circuit, a generator, and circuit-breakers connecting the generator to the circuit, of means for causing the circuit-breakers to open upon the persistence of abnormal circuit conditions of a predetermined period of time, an exciter for the generator, a resistance, and means for introducing the resistance into the field magnet circuit of the exciter promptly upon the occurrence of the said abnormal circuit conditions.

In testimony whereof, I have hereunto subscribed my name this 23rd day of November, 1907.

RAY P. JACKSON.

Witnesses:
H. B. INGRAM,
BIRNEY HINES.

---

It is hereby certified that in Letters Patent No. 1,116,430, granted November 10, 1914, upon the application of Ray P. Jackson, of Wilkinsburg, Pennsylvania, for an improvement in "Systems of Electrical Distribution," an error appears in the printed specification requiring correction as follows: Page 3, line 1, for the word "of" read *for;* and that the said Letters Patent should be read with this correction therein that the same may conform to the record of the case in the Patent Office.

Signed and sealed this 15th day of December, A. D., 1914.

[SEAL.]

J. T. NEWTON,
*Acting Commissioner of Patents.*